United States Patent

Cook

[15] 3,698,380
[45] Oct. 17, 1972

[54] WEED BURNER

[72] Inventor: Einar Cook, 4160 East Shaw Avenue, Fresno, Calif. 93612

[22] Filed: Jan. 8, 1971

[21] Appl. No.: 105,009

[52] U.S. Cl. .................................. 126/271.2 A
[51] Int. Cl. ................................... A01m 15/00
[58] Field of Search..126/271.2 R, 271.2 A, 271.2 C, 126/271.3

[56] References Cited

UNITED STATES PATENTS

| | | | |
|---|---|---|---|
| 3,382,864 | 5/1968 | Fannin et al. | 126/271.2 A |
| 3,259,122 | 7/1966 | Lenker | 126/271.2 A |
| 2,725,875 | 12/1955 | Broad | 126/271.2 A |
| 3,362,397 | 1/1968 | Murphy | 126/271.2 A |
| 1,943,218 | 1/1934 | Guttormson | 126/271.3 |

Primary Examiner—Charles J. Myhre
Attorney—Huebner & Worrel

[57] ABSTRACT

A weed burner adapted for ground traversing movement in a predetermined forward direction of travel along the berm of a tree line in an orchard or the like providing a housing disposed in predetermined elevationally spaced relation to the ground forming a combustion chamber between the housing and the ground and having ignition means borne by the housing adjacent to the combustion chamber and blower means connected to the housing for producing a relatively high velocity airstream above the combustion chamber and outwardly from the housing in a laterally extended path relative to the direction of ground traversement of the burner so as to direct heat and smoke emanating from the combustion chamber transversely through the tree line and outwardly away from the foliage of the trees.

12 Claims, 4 Drawing Figures

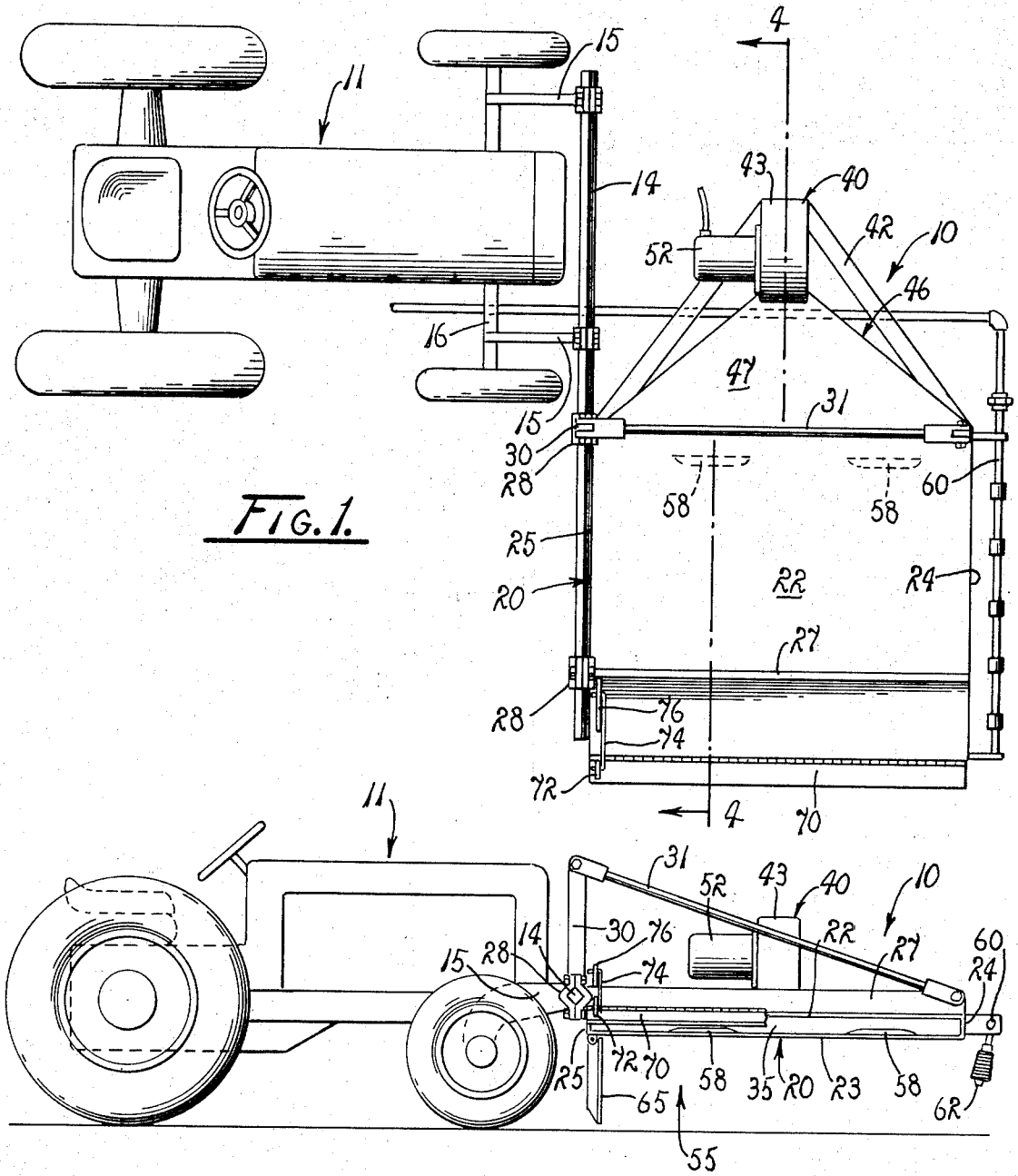

WEED BURNER

BACKGROUND OF THE INVENTION

The destruction of weeds and unwanted grasses along the berm or ridge of the tree line in an orchard has long been a problem in orchard maintenance. The most expeditions procedure for removing such undesirable growth is by controlled burning which, however, has only been accomplished with hazard to the trees. The conventional weed burning machines are normally employed along the sides of highways and the like having relatively few trees and shrubs to protect against the relatively high intensity flame generated by such weed burners. Such conventional weed burners, however, are not adaptable for use in orchards in view of the chimney effect which they produce causing heat and smoke to swirl upwardly therefrom through the tender foliage and fruit of the trees. This precludes the use of such conventional weed burners during the period of greatest weed growth when the trees and fruit thereon are most vulnerable. The subject invention overcomes these problems in order safely to destroy the weeds along the berm of the tree line in an orchard without damaging the upper foliage and fruit of the trees.

SUMMARY OF THE INVENTION

Accordingly, it is an object of the present invention to provide an improved weed burner capable of being safely employed in an orchard.

Another object is to provide such an improved weed burner which is capable of generating a sufficiently hot flame effectively substantially to destroy all weeds and other undesirable growth along the tree line in an orchard with a minimum of hazard to the trees.

Another object is to provide a weed burner of the character described which is adapted readily to be mounted on and transported by a prime mover along the berm of the tree line in an orchard.

Another object is to provide an improved weed burner which is effective to scrape over and remove the burned stubble from the ground in a single pass during the burning operation.

Another object is to provide an improved weed burner which is effective to shield the upper foliage of the trees against the heat radiated from the burner during the weed burning operation.

Another object is to provide an improved weed burner which is capable of effectively diverting the heat and smoke emanating from the burner laterally through the tree line to preclude the usual upward movement of such heat and smoke through the upper foliage of the trees.

Another object is to provide an improved weed burner which utilizes a relatively large, substantially flat, hollow housing through which a high velocity airstream is directed both to cool the foliage shielding housing and to draw and propel the heat and smoke from the burner outwardly from the housing so as to divert such heat and smoke away from the upper foliage of the trees.

BRIEF DESCRIPTION OF THE DRAWINGS

FIG. 1 is a top plan view of a weed burner embodying the principles of the present invention mounted for ground traversing movement on the front end of a tractor.

FIG. 2 is a side elevation of the weed burner of FIG. 1.

DESCRIPTION OF THE PREFERRED EMBODIMENT

Figure 3:
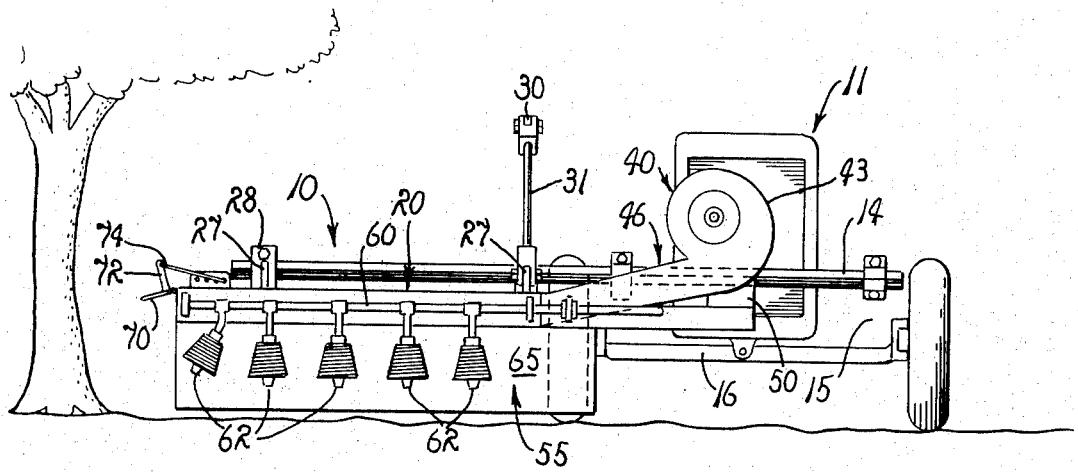
FIG. 3 is a front elevation of the weed burner disposed in operating position closely adjacent to the berm of a tree line within an orchard.

Referring more particularly to the drawings, a weed burner embodying the principles of the present invention is generally indicated by the reference numeral 10. The weed burner is shown mounted in forwardly laterally extended relation from a prime mover such as a tractor indicated by the reference numeral 11. The burner is conveniently carried on an elongated tool mounting bar 14 secured in laterally outwardly extended relation from the front end of the tractor by a pair of forwardly projecting arms 15 secured at their rearward ends to the front axle 16 of the tractor.

The weed burner provides a substantially square flat hollow housing 20 having spaced substantially parallel upper and lower wall panels 22 and 23, respectively, and opposite leading and trailing sides 24 and 25, respectively. A pair of elongated strengthening ribs 27 are edgewardly disposed upon the upper surface of the upper wall panel 22 in spaced, substantially parallel relation and are secured thereto as by welding or the like. Each of the rails mounts one-half of a clamping bracket assembly 28 at its rearward end adjacent to the trailing side 25 of the housing for clamping about the tool mounting bar 14. The innermost bracket 28 has a substantially vertically extended arm 30 mounted thereon which has an upper end mounting the rearward end of an elongated cantilever support rod 31 having a forward end connected to the opposite forward end of its associated strengthening rail 27.

Figure 4:
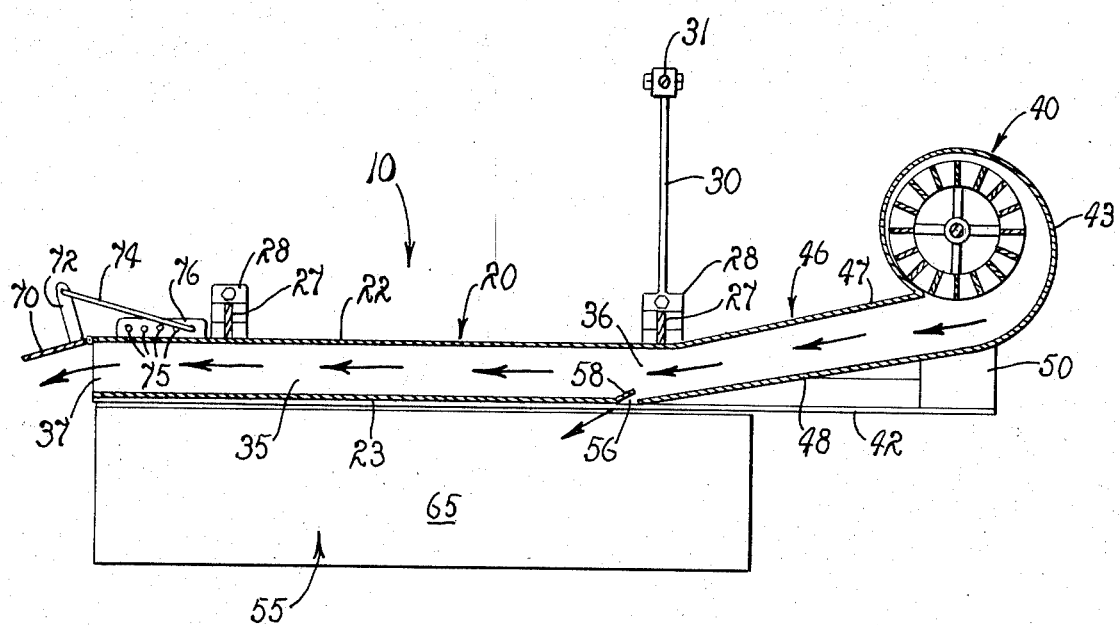
FIG. 4 is a somewhat enlarged transverse vertical section through the weed burner, taken on line 4—4 of FIG. 1.

The upper and lower wall panels 22 and 23, respectively, of the housing and the leading and trailing sides 24 and 25 thereof circumscribe an elongated relatively narrow passage 35 through the housing 20. The passage has an inner inlet end 36 and an opposite discharge end 37. A relatively high velocity airstream is directed through the passage 35 by a blower 40 mounted on a support frame 42 extended from the lower wall panel 23 of the housing. The blower includes a convolute casing 43 having a substantially triangular air transfer duct 46 extending therefrom for connection to the inner end of the housing in communication with the passage 35 therethrough, as best shown in FIGS. 1 and 4. The duct has an upper panel 47 and a spaced, substantially parallel lower panel 48 secured, as by welding or the like, to their respectively associated upper and lower wall panels 22 and 23 of the housing 20. A bracket 50 is disposed upon the blower support frame in supporting relation to the lower wall panel 48 of the blower casing 43 to dispose the blower in somewhat upwardly spaced relation from the housing 20 in order downwardly to incline the air transfer duct toward the passage 35 in the housing. A hydraulic motor 52 is employed to drive the blower and is connected to a source of hydraulic fluid under pressure and suitable controls, not shown, on the tractor 11.

As best shown in FIG. 2, the clamping brackets 28 and cantilever rod 31 support the housing 20 on the tool mounting bar 14 on the tractor in spaced, substantially parallel relation to the ground in order to form a weed burning combustion chamber 55 between the lower wall panel 23 of the housing and the ground. In order to provide sufficient oxygen for supporting combustion within the chamber 55 beneath the housing 20, a pair of air supply openings 56 are formed through the lower panel 23 of the housing closely adjacent to the air transfer duct 46 from the blower 40 by striking upwardly therefrom a pair of elongated louvers 58, as best shown in FIG. 4. The louvers extend upwardly into the air passage 35 in order to provide a scoop or air diverting tab for directing a sufficient quantity of air downwardly through the openings and into the combustion chamber 55.

Along the leading side 24 of the housing 20 is mounted an elongated gas manifold pipe 60 which has a rearwardly extended gas supply conduit connected at its rearward end, not shown, to a source of suitable fuel such as propane, butane, or the like carried on the tractor 11. A plurality of flame projecting nozzles 62 are mounted in depending relation from the manifold pipe in longitudinally spaced relation therealong to project a sheet of flame downwardly against the ground substantially coextensive with the leading side 24 of the housing ahead of the combustion chamber 55. The combustion chamber is substantially closed at the trailing side 25 of the housing by a depending flap 65 pivotally mounted on the housing. Accordingly, the heat generated by the nozzles 62 is substantially concentrated within the combustion chamber beneath the lower wall panel 23 of the housing ahead of the flap 65.

An airstream restricting gate 70 is pivotally mounted on the upper wall panel 22 of the housing immediately above the discharge end 37 of the passage 35. The gate has an upwardly extended arm 72 mounted thereon which pivotally mounts an elongated adjusting rod 74 having an opposite end selectively engageable in a plurality of spaced openings 75 in an elongated plate 76 disposed upon the upper wall panel 22 of the housing. In this manner, the discharge orifice 37 of the passage can be adjustably restricted in order to deflect the airstream downwardly angularly outwardly from the housing. Such restriction produces a venturi effect in order to create a low pressure area immediately outwardly adjacent to the combustion chamber 55.

OPERATION

The operation of the described embodiment of the subject invention is believed to be clearly apparent and is briefly summarized at this point. As best shown in FIG. 3, during normal operation, the weed burner 10 is traveled in a predetermined forward direction along the berm of a tree line in an orchard with the discharge end 37 of the air passage 35 of the housing 20 passing closely adjacent to the trunks of the trees along such tree line. During such movement, the relatively hot curtain of flame generated along the leading side 24 of the housing is directed against the ground to burn and destroy all undesirable growth along the berm of the tree line over which the burner is transported.

The high velocity airstream generated by the blower 40 is continually traveled through the passage 35 within the housing and outwardly from the discharge end 37 thereof. A small portion of the airstream is deflected downwardly by the louvers 58 and through the openings 56 in the lower wall panel 23 to insure full combustion of the plants within the combustion chamber beneath the housing. The airstream flowing through the passage 35 further serves to maintain the upper wall panel 22 of the housing relatively cool so as dependably to shield the relatively tender foliage and fruit of the trees from the hot combustion chamber 55 beneath the housing as the weeds are being consumed. Accordingly, there is substantially no upward radiation of heat by way of the housing 20 into the upper foliage of the trees.

The upward spiraling chimney effect of smoke and heat from the combustion chamber 55 through the foliage of the trees is further precluded by the lateral discharge of the airstream outwardly through the discharge end 37 of the passage 35 upon proper adjustment of the airstream restricting gate 70. Such gate appreciably increases the velocity of the airstream flowing outwardly from the housing and creates a low pressure area adjacent to the combustion chamber. This is effective to draw the heat and smoke laterally outwardly from the combustion chamber with the high velocity airstream propelling such products of combustion further laterally outwardly through the tree row for dissipation well past the opposite sides of the trees. It is apparent that the trunks of the trees are sufficiently protected.

During such travel of the weed burner 10 along the tree line, the pivotally mounted flap 65 is effective to scrape over and remove the burned stubble from the ground. The flap serves effectively substantially to level the ground and to clear it of any undesirable and hazardous upwardly projecting stalk portions of the burned plants. The flap, however, is permitted to pivot over any large obstructions such as rocks and the like in order to preclude damage to the burner or impede the forward progress of the burner along the tree line during the burning operation.

In view of the foregoing, it is readily apparent that the structure of the present invention provides an improved weed burner for use in destroying weeds along the berm or ridge of a tree line in an orchard or the like. The substantially enclosed combustion chamber formed beneath the housing of the burner insures substantially complete consumption of the weeds over which the burner is traveled without any appreciable damage to the adjacent trees. The airstream passing through the housing not only cools the upper surface thereof so as to preclude any direct radiation of heat upwardly into the upper foliage of the trees but further serves positively to draw out the heat and smoke from the combustion chamber beneath the housing and to propel it laterally through the tree line a safe distance to insure that such heat and smoke is sufficiently cooled and dissipated in the relatively open space between the adjacent rows of trees in the orchard.

Although the invention has been herein shown and described in what is conceived to be the most practical and preferred embodiment, it is recognized that departures may be made therefrom within the scope of the Having described my invention, what I claim as new and desire to secure by Letters Patent is:

1. A weed burner adapted for ground traversing movement in a predetermined forward direction of travel along the berm of a tree line in an orchard or the like comprising a housing disposed in predetermined elevationally spaced relation to the ground forming a combustion chamber between said housing and the ground, ignition means borne by said housing adjacent to said combustion chamber, and means for diverting heat and smoke emanating from the combustion chamber transversely through the tree line and away from the foliage including a blower connected to said housing for producing a relatively high velocity airstream above said combustion chamber outwardly from the housing in a laterally extended path relative to said direction of travel.

2. The weed burner of claim 1 in which said housing has a substantially flat configuration, and said means for diverting heat and smoke further includes means defining an elongated passage for said airstream traversing the upper portions of said housing, said blower being mounted on the housing in communicating relation with one end of said passage, and means defining an air discharge orifice at the opposite end of said passage.

3. The weed burner of claim 2 including means on said housing for restricting the free passage of air through said discharge orifice to create a low pressure area outwardly adjacent to said combustion chamber beneath the housing effectively to draw heat and smoke outwardly therefrom into said high velocity airstream.

4. The weed burner of claim 3 in which said means defining said elongated passage includes spaced, substantially parallel upper and lower panels and opposite leading and trailing sides circumscribing said airstream, and at least one opening through said lower panel of the housing through which a relatively small portion of said airstream is directed into said combustion chamber for supporting combustion therein.

5. The weed burner of claim 4 in which a louvre is struck upwardly into said passage from said lower panel to form said opening therethrough to deflect said small portion of said airstream into said combustion chamber.

6. A weed burner adapted for ground traversing movement in a predetermined forward direction of travel along the berm of a tree line in an orchard or the like comprising a substantially flat tubular housing disposed in predetermined elevationally spaced relation to the ground forming a combustion chamber between said housing and the ground, flame projecting means borne by said housing to direct a relatively hot flame against the ground within said combustion chamber beneath the housing, and blower means connected to said housing for directing a relatively high velocity airstream through the housing and outwardly therefrom through the tree line for cooling the housing so that it dependably shields the foliage and fruit of the trees from the combustion chamber and during discharge from the housing said airstream being effective to draw heat and smoke from the combustion chamber and propel them laterally through the tree line.

7. The weed burner of claim 6 in which said housing includes louvre means to direct a relatively small portion of said airstream into said combustion chamber, a main discharge opening from said housing, and gate means on said housing extended into said discharge opening for producing a venturi effect to draw the products of combustion from said combustion chamber and to propel them laterally through the tree line so as to preclude upward movement of such products of combustion through the foliage and fruit of the trees.

8. The weed burner of claim 7 in which said housing has predetermined opposite leading and trailing sides, said flame projecting means including a plurality of burner nozzles disposed along said leading edge of the housing to produce a curtain of flame against the ground ahead of said combustion chamber.

9. The weed burner of claim 8 including a flap suspended from said trailing edge of said housing in substantially rearwardly closing relation to said combustion chamber, and an exhaust opening from said combustion chamber between said flame curtain and said flap in juxtaposition to said main discharge opening from the housing within which a low pressure area is created by said relatively high velocity airstream from the housing.

10. The weed burner of claim 9 in which said flap is pivotally mounted on said housing and has sufficient weight to scrape over and remove burned stubble from the ground but is permitted to pivot over large obstructions such as rocks and the like encountered during said ground traversement of the burner.

11. A weed burner comprising a housing; means mounting the housing for ground traversing movement, the housing having a downwardly disposed concavity defining a combustion chamber open to the ground, said housing also having an air passage extended transversely of the direction of said ground traversing movement adjacent and above the combustion chamber; burner means in the combustion chamber; and means for projecting an air blast through the passage and laterally outwardly of the housing to carry heat rising from the combustion chamber laterally outwardly of the direction of said movement.

12. The weed burner of claim 11 in which the combustion chamber has an open side disposed in the direction of the lateral projection of the air blast and an air supply opening is provided between the air passage and the combustion chamber to supply air to the burner means and to discharge the products of combustion through said open side beneath the projection of the air blast from the passage.

* * * * *